United States Patent
Farlow

(10) Patent No.: US 7,319,719 B1
(45) Date of Patent: Jan. 15, 2008

(54) PARALLEL EQUALIZATION FOR SYSTEMS USING TIME DIVISION MULTIPLE ACCESS

(75) Inventor: Charles S. Farlow, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1262 days.

(21) Appl. No.: 09/598,870

(22) Filed: Jun. 21, 2000

(51) Int. Cl.
*H03H 7/40* (2006.01)
*H03H 7/30* (2006.01)
*H03K 5/159* (2006.01)

(52) U.S. Cl. ............... 375/229; 375/231; 375/232; 375/233; 375/234; 375/230

(58) Field of Classification Search ........ 375/229–236, 375/14, 102
See application file for complete search history.

(56) References Cited

U.S. PATENT DOCUMENTS

| | | | | |
|---|---|---|---|---|
| 4,064,370 A * | 12/1977 | Coonce et al. | ............... | 370/380 |
| 4,245,320 A * | 1/1981 | Desblache | ................... | 375/224 |
| 4,313,202 A * | 1/1982 | Kameya | ....................... | 375/235 |
| 4,613,975 A | 9/1986 | Aoyagi et al. | | |
| 4,621,355 A | 11/1986 | Hirosaki et al. | | |
| 4,821,288 A * | 4/1989 | Peile | ........................... | 375/229 |
| 4,821,289 A * | 4/1989 | Peile | ........................... | 375/232 |
| 5,150,400 A * | 9/1992 | Ukegawa | ............... | 379/100.17 |
| 5,602,507 A * | 2/1997 | Suzuki | ......................... | 329/304 |
| 5,787,118 A * | 7/1998 | Ueda | ............................ | 375/232 |
| 5,898,684 A | 4/1999 | Currivan et al. | | |
| 6,084,926 A * | 7/2000 | Zak et al. | .................... | 375/341 |
| 6,347,391 B1 * | 2/2002 | Uesugi et al. | ............... | 714/795 |
| 6,466,610 B1 * | 10/2002 | Schilling | ..................... | 375/141 |
| 6,501,610 B1 * | 12/2002 | Sugawara et al. | ............ | 360/65 |
| 6,574,207 B2 * | 6/2003 | Kurtz | ......................... | 370/337 |
| 6,665,308 B1 * | 12/2003 | Rakib et al. | ................. | 370/441 |
| 6,980,584 B1 * | 12/2005 | Yaguchi | ..................... | 375/148 |
| 2002/0080898 A1 * | 6/2002 | Agazzi et al. | ............... | 375/355 |
| 2003/0063680 A1 * | 4/2003 | Nedic et al. | ................. | 375/260 |

OTHER PUBLICATIONS

"Updator-shaped adaptive parallel equalization (U-SHAPE) using set-membership identification" Gollamudi, S.; Yih-Fang Huang; IEEE International Symposium on , vol. 2 , May 12-15, 1996 pp. 13-16 vol. 2.*

Sklar, B. "Rayleigh Fading Channels in Mobile Digital Communication Systems, Part I: Characterization," *IEEE Communications Magazine*, Sep. 1997.

Sklar, B. "Rayleigh Fading Chanenls in Mobile Digital Communication Systems, Part II: Mitigation," *IEEE Communications Magazine*, Sep. 1997.

(Continued)

*Primary Examiner*—Curtis B. Odom
(74) *Attorney, Agent, or Firm*—Fogg & Powers LLC

(57) ABSTRACT

An equalization circuit is provided. The equalization circuit includes an input adapted to receive signals from a communications channel. The equalization circuit further includes a plurality of equalizer circuits coupled to the input and operable to generate a plurality of intermediate signals. A selector circuit is also included. The selector circuit is responsive to the plurality of equalizer circuits and selects one of the intermediate signals. The equalization circuit also includes an output coupled to the selector circuit that receives the selected intermediate signal.

10 Claims, 3 Drawing Sheets

OTHER PUBLICATIONS

Intel, STEL-9244 Data Sheet, STEL-9244, 5-40 MHz, QPSK Burst Receiver, pp. 1-15 (Dec. 15, 1999).

Intel, STEL-9257 User'Manual, STEL-9257, 5-65 MHz, QPSK Burst Receiver, pp. 1-29 (Dec. 15, 1999).

Lucky, R.W., "Automatic Equalization for Digital Communication," *Bell Syst. Tech. J.*, vol. 44, pp. 547-588, Apr. 1965.

Miller, S.L., "Transient Behavior of the Minimum Mean-Squared Error Receiver for Direct-Sequence Code-Division Multiple-Access Systems," *Proc. of IEEE MILCOM*, 1994, pp. 52-56.

Miller, S.L., "An Adaptive Direct-Sequence Code-Division-Multiple-Access Receiver for Multiuser-Interference Rejection," *IEEE Trans. Comm.*, vol. 42, No. 2/3/4, Feb./Mar./Apr. 1995, pp. 1746-1754.

Nowlan, S. J., et al., "A Soft Decision-Directed LMS Algorithm for Blind Equalization," *IEEE Trans. Comm.*, vol. 41, No. 2, Feb. 1993, pp. 275-279.

Pahlavan, K. et al., "Performance of Adaptive Matched Filter Receivers Over Fading Multipath Channels," *IEEE Trans. Comm.*, vol. 38, No. 12, Dec. 1990, pp. 2106-2113.

Proakis, J., *Digital Communications*, McGraw-Hill, New York (1983), Title Page, Copyright Page, Table of Contents, and Chapters 6 and 7.

Proakis, J., "Adaptive Equalization for TDMA Digital Mobile Radio," *IEEE Trans. on Vehicular Tech.*, vol. 40, No. 2, May 1991, pp. 333-341.

Qureshi, S.U.H., "Adaptive Equalization," *Proc. IEEE*, vol. 73, pp. 1349-1387, Sep. 1985.

Rappaport, T., *Wireless Communication: Principles and Practice*, Prentice Hall, New Jersy (1996), Title Page, Copyright Page, Table of Contents, and Chapters 4 and 6.

J. H. Reed, "The Performance of Time-Dependent Adaptive Filters for Interference Rejection," *IEEE Trans. on ASSP*, vol. 38, No. 8, Aug. 1990, pp. 1373-1385.

Bingham, J., *The Theory and Practice of Modem Design*, John Wiley & Sons, New York (1988), Title Page, Copyright Page, and Chapters 8 and 9.

Broadcom Corporation, *Product Brief—BCM3137*, (offered for sale as early as Jul. 8, 1998), 2 pp.

Chuang, C-I, "The Effects of Time Delay Spread on Portable Radio Communications Channels with Digital Modulation," *IEEE Journal on Selected Areas in Communications*, vol. SAC-5, No. 5, Jun. 1987.

Doherty, J. F., "Linearly Constrained Direct-Sequence Spread-Spectrum Interference Rejection," *IEEE Trans. Comm.*, vol. 42, No. 2/3/4, Feb./Mar./Apr. 1994, pp. 865-872.

Haykin, S., *Adaptive Filter Theory*, Prentice Hall, New Jersey (1991), Title Page, Copyright Page, and Table of Contents.

Honig, M, et al. "Blind Adaptive Multiuser Detection," *IEEE Trans. on Information Theory*, vol. 41, No. 4, Jul. 1995, pp. 944-960.

Klein, G. K. et al., "Equalizers for Multi-User Detection in Code Division Multiple Access Mobile Radio Systems," *Proc. of IEEE Veh. Tech. Conf.*, 1994, pp. 762-766.

Liu, Y. et al., "Identification of Frequency Non-selective Fading Channels Using Decision Feedback and Adaptive Linear Prediction," *IEEE Trans. Comm.*, vol. 43, No. 2/3/4, Feb./Mar./Apr. 1995, pp. 1484-1492.

\* cited by examiner

PARALLEL EQUALIZATION FOR SYSTEMS USING TIME DIVISION MULTIPLE ACCESS

TECHNICAL FIELD

The present invention relates generally to the field of telecommunications and, in particular, to parallel equalization for systems using time division multiple access.

BACKGROUND

Telecommunications systems transmit signals between user equipment, e.g., telephones, radios, and computers, over a network. Conventional telecommunications systems include, but are not limited to, the public switched telephone network (PSTN), the Internet, wireless networks, and cable television networks. These networks typically include transmission media such as coaxial cable, copper wires, optical fibers, and wireless links, e.g., radio and satellite communications.

Conventionally, transmission media carry the signals over the network in channels. In carrying signals, the channels may degrade or otherwise negatively impact the quality of the signals generated by one user for transmission to another user due to characteristics of the channel. For example, "multipath fading" is one source of degradation in signals of the channel in a telecommunications network. In wireless networks, multipath fading is often experienced due to the reception of signals that traverse different propagation paths. The multiple propagation paths are typically produced by atmospheric refraction and layering. Alternatively, the multipath signals may be produced by reflections from ground clutter near a radio receiver. Other systems also may suffer from multipath fading. For example, hybrid fiber-coax systems typically experience multipath fading due to impedance mismatches between various network components.

Time dispersion of a multipath channel is often characterized by the root mean squared (rms) time delay spread ($\sigma_\tau$). This quantity is defined as the square root of the second central moment of the power delay profile. In the frequency domain, fading is often characterized as "flat" or "frequency selective" based on the relationship between rms delay spread and the duration of the modulated digital signal ($T_{SYM}$). Flat fading occurs when the rms time delay spread of the received signal is small enough to not cause significant intersymbol interference (ISI). A common relationship used in industry is that $\sigma_\tau < 0.1\, T_{SYM}$ to characterize a channel as flat fading. Conversely, a channel may be considered frequency selective if the $\sigma_\tau > 0.1\, T_{SYM}$. There is not a sharp distinction between the two types of channels as these mathematical relationships imply, but they serve as a starting point for further analysis. If a communications channel is frequency-selective, the resultant intersymbol interference produces a system bit error rate floor.

During the design of a particular network, circuits are often included in an attempt to overcome these problems to produce a signal at a receiver that fairly represents the signal generated at a transmitter. For example, an equalizer is often used to compensate for a frequency-selective channel in a digital communications system. The equalizer reduces the intersymbol interference present at its output port, thereby lowering the system bit error rate produced by such interference. In effect, the equalizer acts as an inverse filter of the communications channel.

For an equalizer to be effective, the equalizer settings, e.g., the equalizer coefficients, are selected so as to compensate for the degrading effects of the channel at the time of transmission. In many systems, the channel characteristics are generally unknown and may change over time. Adaptive equalizers are commonly used to compensate for a time varying channel transfer function. In systems that process a continuous signal, the adaptation of equalizer coefficients is well understood by those skilled in the art. However, single adaptive equalizers, when employed in Time Division Multiple Access systems, may not be effective in reducing intersymbol interference since the channel may have significantly changed since the last transmission from a particular user. In fact, if a transmission over the channel is equalized with the equalizer settings used for a prior transmission, the performance of the system may be degraded more than if no equalization were performed at all.

For the reasons stated above, and for other reasons stated below which will become apparent to those skilled in the art upon reading and understanding the present specification, there is a need in the art for improvements in compensating for multipath fading in telecommunications systems.

SUMMARY

The above mentioned problems with telecommunications systems and other problems are addressed by embodiments of the present invention and will be understood by reading and studying the following specification. Embodiments of the present invention process received signals in parallel. This processing includes equalizing the received signal with a number of different equalizers. The receiver then selects among the outputs of the various equalizers to provide an output for further processing at the receiver. By processing signals in parallel equalizers, channels with time varying characteristics are adequately compensated for adverse affects of multipath fading and the like.

More particularly, in one embodiment an equalization circuit is provided. The equalization circuit includes an input adapted to receive signals from a communications channel. The equalization circuit further includes a plurality of equalizer circuits coupled to the input and operable to generate a plurality of intermediate signals. A selector circuit is also included. The selector circuit is responsive to the plurality of equalizer circuits and selects one of the intermediate signals. The equalization circuit also includes an output coupled to the selector circuit that receives the selected intermediate signal.

In one embodiment, an equalization circuit is provided. The circuit includes an input adapted to receive signals from a communication channel, an equalizer bank having at least two equalizers coupled in parallel and coupled to the input and a first decoder bank having at least two packet decoder circuits coupled in parallel, each packet decoder circuit responsive to a corresponding one of the at least two equalizers of the equalizer bank. The circuit further includes a selector circuit coupled to the decoder bank that selects an output signal of one of the at least two equalizer circuits based on processing of the decoder bank and an output coupled to the selector circuit that receives the selected output signal. The at least two packet decoder circuits comprise decoder circuits that process cyclic redundancy checks (CRCs) for Ethernet packets.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
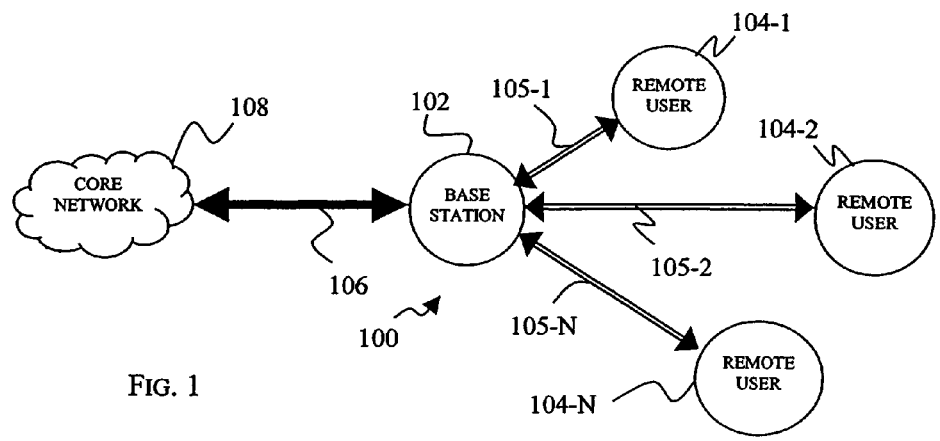
FIG. 1 is a block diagram of an embodiment of a system that uses parallel equalization of a time division multiple access signals in the uplink of the system according to the teachings of his invention.

FIG. 1 is a block diagram of an embodiment of a system, indicated generally at 100, that uses parallel equalization of time division multiple access signals in the uplink of system 100 according to the teachings of the present invention. In one embodiment, system 100 is a multipoint-to-point network. System 100 includes base station 102. Base station 102 is communicatively coupled to a plurality of remote users 104-1, . . . , 104-N over communication links 105-1, . . . , 105-N. Base station 102 is also coupled to core network 108 over high-speed, backhaul communications link 106. Link 106 carries communication between core network 108 via base station 102 for remote users 104-1, . . . , 104-N. In one embodiment, core network 108 comprises the Internet. In other embodiments, core network 108 comprises the Public Switched Telephone Network (PSTN), a wireless network, or any other appropriate telecommunications network.

System 100 carries signals in two directions. In the forward direction, system 100 carries signals from core network 108 to remote users 104-1, . . . , 104-N. Base station 102 multiplexes incoming backhaul data from the core network 108 to be transferred to remote users 104-1, . . . , 104-N over communication links 105-1, . . . , 105-N. The downlink media for communication links 105-1, . . . , 105-N comprises, in one embodiment, a wireless media, e.g., transmissions in the MMDS spectrum between fixed wireless units. In other embodiments, the downlink media for communication links 105-1, . . . , 105-N comprises one of coaxial cable, fiber optics, and other appropriate communications media. In one embodiment, the downlink from base station 102 uses time division multiplexing (TDM). In other embodiments, the downlink from base station 102 uses frequency division multiplexing (FDM) or other appropriate multiplexing technology.

In the reverse direction, system 100 carries signals from remote users 104-1, . . . , 104-N to base station 102 over communication links 105-1, . . . , 105-N. Base station 102 aggregates data from remote users 104-1, . . . , 104-N and transmits data over backhaul communications link 106 to core network 108. In the uplink or reverse direction, system 100 uses time division multiple access (TDMA) as the multiple access method. TDMA is used to share a fixed allocation of bandwidth in the frequency domain. In this access method, each user transmits over the full link bandwidth for a short duration of time, hereafter referred to as a "time slot." In one embodiment, base station 102 exercises complete control of timeslot assignment. In other embodiments, contention algorithms are used to compete for available time slots. Further, in one embodiment timeslots have a fixed duration. In other embodiments, timeslots have a variable duration.

Base station 102 includes an equalization circuit that processes signals from remote users 104-1, . . . , 104-N. The equalization circuit processes each signal in parallel using a plurality of equalizer circuits to compensate for adverse effects of multipath fading in communication channels 105-1, . . . , 105-N. Essentially, a signal from a remote user is processed in parallel by a number of different equalizers. The output of one of the equalizers is further processed by the base station receiver and is provided to core network 108 over backhaul communication link 106. Thus, base station 102 is less susceptible to errors caused by changes in the channel between transmissions from a specific remote user because the base station has multiple options to choose from to provide an acceptable signal upstream to core network 108.

Figure 2:
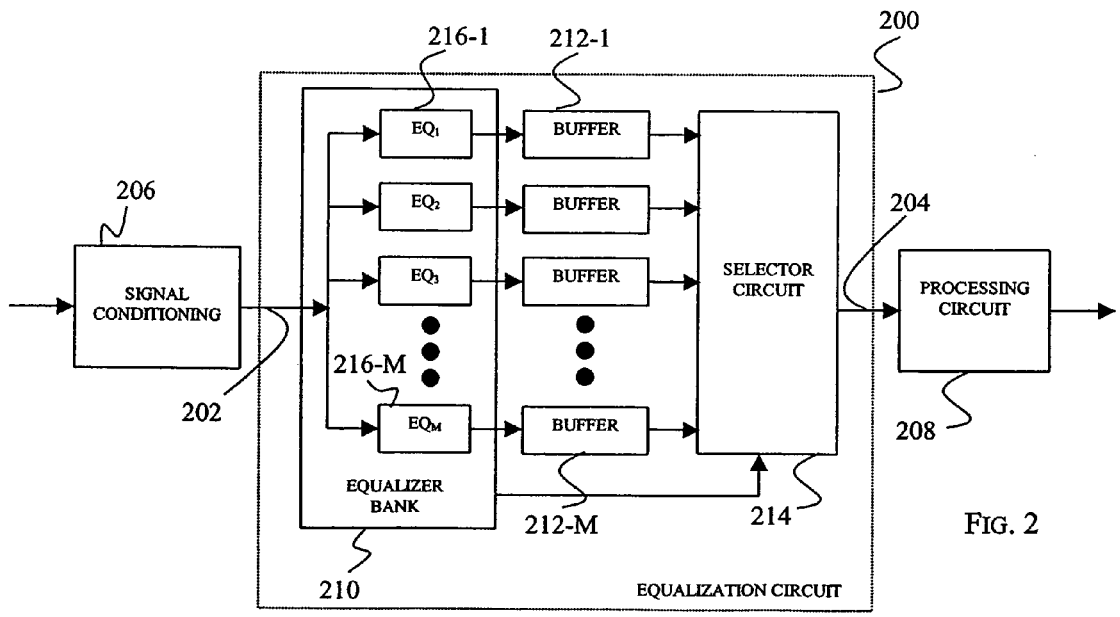
FIG. 2 is a block diagram of an embodiment of a parallel equalizer circuit according to the teachings of the present invention.

FIG. 2 is a block diagram of an embodiment of a parallel equalization circuit, indicated generally at 200, according to the teachings of the present invention. Equalization circuit 200 includes input 202 and output 204. Input 202 is coupled to receive signals from a communication channel via signal conditioning circuit 206. In one embodiment, signal-conditioning circuit 206 comprises automatic gain control circuitry. In other embodiments, signal-conditioning circuit 206 includes other appropriate circuitry for conditioning a signal from a communications channel. In this embodiment, output 204 is coupled to processing circuit 208. Processing circuit 208 provides additional processing to this output of equalization circuit 200. For example, processing circuit 208, in one embodiment, provides for forward error correction decoding, descrambling, and other appropriate processing of the signals from the communication channel.

Equalization circuit 200 includes equalizer bank 210, buffers 212-1, . . . , 212-M, and selector circuit 214. Equalizer bank 210 includes a plurality of equalizer circuits 216-1, . . . , 216-M. Each of equalizer circuits 216-1, . . . , 216-M includes an input coupled to input 202 of equalization circuit 200 and an output coupled to a corresponding one of the buffers 212-1, . . . , 212-M. In one embodiment, equalizer circuits 216-1, . . . , 216-M each include decision and symbol-to-bit mapping functions.

Each of equalizer circuits 216-1, . . . , 216-M is either an adaptive equalizer or a fixed equalizer (fixed coefficients). In one embodiment, some of the equalizer circuits 216-1, . . . , 216-M are adaptive and some of the equalizer circuits 216-1, . . . , 216-M are fixed. In another embodiment, each of equalizer circuits 216-1, . . . , 216-M is adaptive. Each of the adaptive equalizer circuits 216-1, . . . , 216-M are either linear or nonlinear. In one embodiment, some of the equalizer circuits 216-1, . . . , 216-M are linear and some of the equalizer circuits 216-1, . . . , 216-M are nonlinear. In another embodiment, each of equalizer circuits 216-1, . . . , 216-M is nonlinear. In one embodiment, the nonlinear equalizers use a decision-feedback topology. In one embodiment, each of the equalizer circuits has a different structure (e.g., transversal or lattice) and adaptation algorithm. In one embodiment, equalizer circuits 216-1, . . . , 216-M use one of a recursive least squares adaptation algorithm, a least mean-square adaptation algorithm, a zero forcing adaptation algorithm, a gradient recursive least squares adaptation algorithm, a fast recursive least squares adaptation algorithm and a square root recursive least squares adaptation algorithm. In some embodiments, the operation of the various equalizer circuits 216-1, . . . , 216-M is varied by loading appropriate coefficients into the equalizer circuits prior to processing a burst transmission from a particular remote user.

Buffers 212-1, . . . , 212-M buffer signals from their respective equalizer circuits 216-1, . . . , 216-M for a selected length of time, $T_{BUF}$, e.g., a timeslot duration. Each of buffers 212-1, . . . , 212-M includes an output coupled to selector circuit 214. In this embodiment, selector circuit 214 also includes an input from equalizer bank 210. The input from equalizer bank 210 provides a signal that indicates the relative quality at the output of each of equalizer circuits 216-1, . . . , 216-M. The signal is used to select a signal from buffers 212-1, . . . , 212-M to be applied to output 204 of equalization circuit 200. The signal is applied to selector circuit 214 at the end of the selected length of time the signal is buffered in buffers 212-1, . . . , 212-M, $T_{BUF}$. In one embodiment, the signal provided to selector circuit 214 comprises a vector with an indication of the quality of performance of each of equalizer circuits 216-1, . . . , 216-M. In one embodiment, the indication comprises the mean-squared error calculated over the time interval, $T_{BUF}$. In other embodiments, the indication comprises peak error or other error indicators calculated over the time interval, $T_{BUF}$.

In operation, equalization circuit 200 processes a signal from signal conditioning circuit 206 with a plurality of equalizers to compensate for the adverse effects of multipath fading in a communication channel. Equalization circuit 200 processes the signal from signal conditioning circuit 206 in parallel in equalizer bank 210. The parallel output to equalizer bank 210 is provided to buffers 212-1, . . . , 212-M. Equalizer bank 210 also provides a signal to selector circuit 214 to select one of the outputs from buffers 212-1, . . . , 212-M. Selector circuit 214 provides the selected output to output 204 of equalization circuit 200 for further processing by processing circuit 208.

Figure 3:
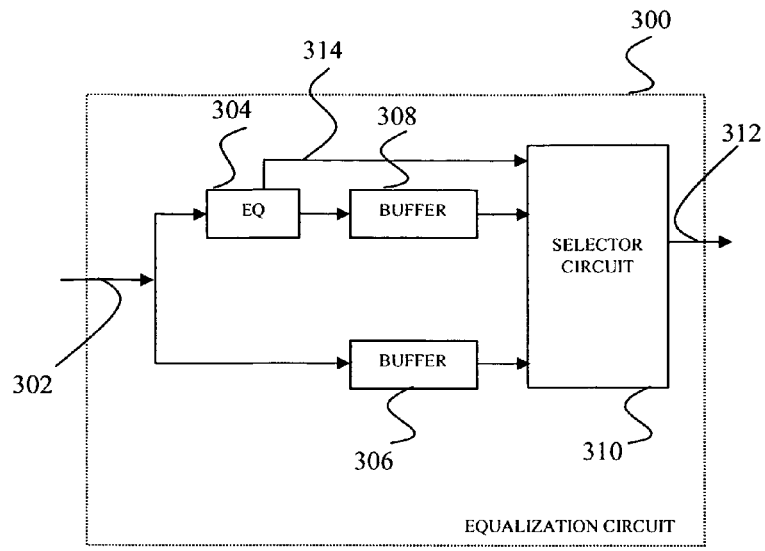
FIG. 3 is a block diagram of another embodiment of parallel equalizer circuit according to the teachings of the present invention.

FIG. 3 is a block diagram of another embodiment of a parallel equalization circuit, indicated generally at 300, constructed according to the teachings of the present invention. Equalization circuit 300 includes input 302 to receive a signal from a communication channel. Input 302 is coupled to equalizer 304 and buffer 306. Equalizer 304 is also coupled to buffer 308. Buffers 306 and 308 are coupled to selector circuit 310. Selector circuit 310 provides an output indicated at 312 for equalization circuit 300. Equalizer 304 also provides a control signal 314 to selector circuit 310. In one embodiment, equalizer 304 includes decision and symbol-to-bit mapping functions.

Equalizer 304 is either an adaptive equalizer or a fixed equalizer (fixed coefficients). In one embodiment, equalizer 304 is one of a linear and a non-linear adaptive equalizer. In one embodiment, equalizer 304 comprises a non-linear equalizer that uses a decision feedback topology. In one embodiment, equalizer 304 uses one of a recursive least squares adaptation algorithm, a least mean-square adaptation algorithm, a zero forcing adaptation algorithm, a gradient recursive least squares adaptation algorithm, a fast recursive least squares adaptation algorithm and a square root recursive least squares adaptation algorithm. In some embodiments, the operation of equalizer 304 is varied by loading appropriate coefficients into equalizer 304 prior to processing a burst transmission from a particular remote user.

In operation, equalizer circuit 300 processes a received signal with equalizer 304. The equalized signal is buffered in buffer 308. The received signal is also buffered in buffer 306. Selector circuit 310 passes either the non-equalized signal from buffer 306 or the equalized signal from buffer 308. The selection mechanism for selector circuit 310 is based the equalization of the signal in equalizer 304. Advantageously, equalization circuit 300 allows equalizer 304 to be bypassed in the event that the channel has changed significantly since the last transmission received at equalization circuit 300. This recognizes the fact that in some instances the channel may have changed significantly since the last transmission such that no equalization is better than equalization based on the prior equalization settings.

Figure 4:
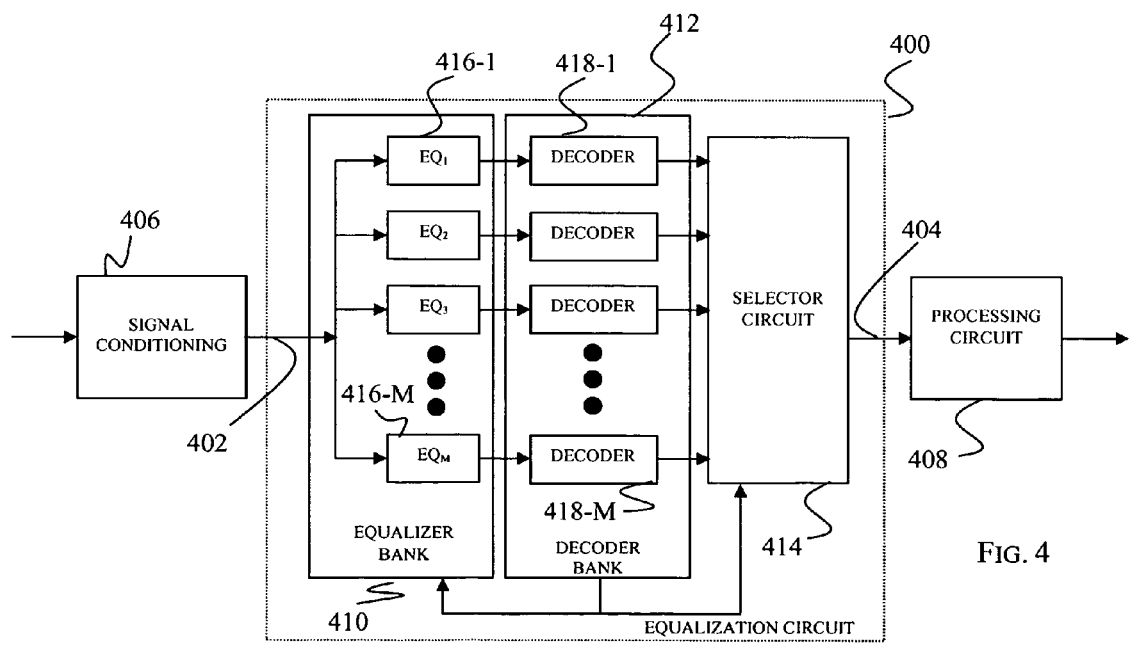
FIG. 4 is a block diagram of another embodiment of parallel equalizer circuit according to the teachings of the present invention.

FIG. 4 is a block diagram of another embodiment of a parallel equalization circuit, indicated generally at 400, and constructed according to the teachings of the present invention. Equalization circuit 400 includes input 402 and output 404. Input 402 is coupled to receive signals from a communication channel via signal conditioning circuit 406. In one embodiment, signal-conditioning circuit 406 comprises automatic gain control circuitry. In other embodiments, signal-conditioning circuit 406 includes other appropriate circuitry for conditioning a signal from a communications channel. In this embodiment, output 404 is coupled to processing circuit 408. Processing circuit 408 provides additional processing to this output of equalizer circuit 400. For example, processing circuit 408, in one embodiment, provides for decoding, and other appropriate processing of the signals from the communication channel.

Equalizer circuit 400 includes equalizer bank 410, decoder bank 412, and selector circuit 414. Equalizer bank 410 includes a plurality of equalizer circuits 416-1, . . . , 416-M. Each of equalizer circuits 416-1, . . . , 416-M includes an input coupled to input 402 of equalization circuit 400 and an output coupled to a corresponding one of the decoders 418-1, . . . , 418-M. In one embodiment, equalizer circuits 416-1, . . . , 416-M each include decision and symbol-to-bit mapping functions.

Each of equalizer circuits 416-1, . . . , 416-M is either an adaptive equalizer or a fixed equalizer (fixed coefficients). In one embodiment, some of the equalizer circuits 416-1, . . . , 416-M are adaptive and some of the equalizer circuits 416-1, . . . , 416-M are fixed. In another embodiment, each of equalizer circuits 416-1, . . . , 416-M is adaptive. Each of the adaptive equalizer circuits 416-1, . . . , 416-M are either linear or nonlinear. In one embodiment, some of the equalizer circuits 416-1, . . . , 416-M are linear and some of the equalizer circuits 416-1, . . . , 416-M are nonlinear. In another embodiment, each of equalizer circuits 416-1, . . . , 416-M is nonlinear. In one embodiment, the nonlinear equalizers use a decision-feedback topology. In one embodiment, each of the equalizer circuits has a different structure (e.g., transversal or lattice) and adaptation algorithm. In one embodiment, equalizer circuits 416-1, . . . , 416-M use one of a recursive least squares adaptation algorithm, a least mean-square adaptation algorithm, a zero forcing adaptation algorithm, a gradient recursive least squares adaptation algorithm, a fast recursive least squares adaptation algorithm and a square root recursive least squares adaptation algorithm. In some embodiments, the operation of the various equalizer circuits 416-1, . . . , 416-M is varied by loading appropriate coefficients into the equalizer circuits prior to processing a burst transmission from a particular remote user.

Decoders 418-1, . . . , 418-M receive signals from their respective equalizer circuits 416-1, . . . , 416-M. In one embodiment, decoders 410-1, . . . , 410-M provide forward error correction for the signals from equalizer circuits 416-1, . . . , 416-M. Decoder bank 412 is coupled to provide a feedback signal to equalizer bank 410 and to provide a selection signal to selector circuit 414. The feedback signal provided to equalizer bank 410 is adapted to be used to modify the coefficients for the equalizers of equalizer bank 410 for the processing of later signals. The selection signal provided to selector circuit 414 provides an indication of the quality of the signals produced by equalizer circuits 416-1, . . . , 416-M. It is noted that a buffering function is included in one embodiment of the decoders of decoder bank 412.

In operation, equalizer circuit 400 processes a signal from signal conditioning circuit 406 with a plurality of equalizers to compensate for the adverse effects of multipath fading in a communication channel. Equalization circuit 400 processes the signal from signal conditioning circuit 406 in parallel in equalizer bank 410. The parallel output of equalizer bank 410 is provided to decoders 418-1, . . . , 418-M. Decoders 418-1, . . . , 418-M provide forward error correction to the signals from their respective equalizer circuits. The decoder bank 412 also provides a signal to selector circuit 414 to select one of the outputs from decoders 418-1, . . . , 418-M. Selector circuit 414 provides the selected output to output 404 of equalization circuit 400 for further processing by processing circuit 408.

Figure 5:
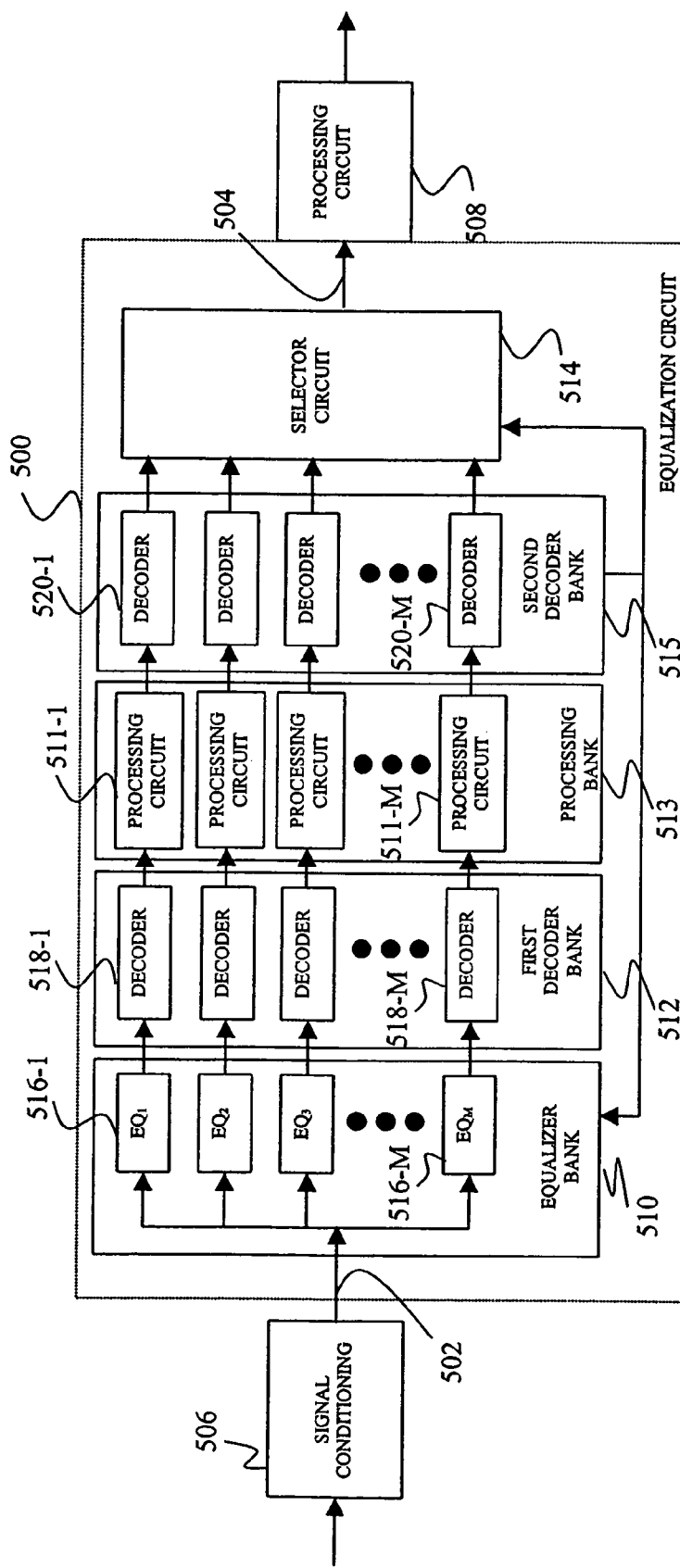
FIG. 5 is a block diagram of another embodiment of parallel equalizer circuit according to the teachings of the present invention.

FIG. 5 is a block diagram of another embodiment of parallel equalization circuit, indicated generally at 500, and constructed according to the teachings of the present invention. Equalization circuit 500 includes input 502 and output 504. Input 502 is coupled to receive signals from a communication channel via signal conditioning circuit 506. In one embodiment, signal-conditioning circuit 506 comprises automatic gain control circuitry. In other embodiments, signal-conditioning circuit 506 includes other appropriate circuitry for conditioning a signal from a communications channel. In this embodiment, output 504 is coupled to processing circuit 508. Processing circuit 508 provides additional processing to this output of equalizer circuit 500.

Equalizer circuit 500 includes equalizer bank 510, first decoder bank 512, processing bank 513, second decoder bank 515, and selector circuit 514. Equalizer bank 510 includes a plurality of equalizer circuits 516-1, . . . , 516-M. Each of equalizer circuits 516-1, . . . , 516-M includes an input coupled to input 502 of equalization circuit 500 and an output coupled to a corresponding one of the decoders 518-1, . . . , 518-M. In one embodiment, equalizer circuits 516-1, . . . , 516-M each include decision and symbol-to-bit mapping functions.

Each of equalizer circuits 516-1, . . . , 516-M is either an adaptive equalizer or a fixed equalizer (fixed coefficients). In one embodiment, some of the equalizer circuits 516-1, . . . , 516-M are adaptive and some of the equalizer circuits 516-1, . . . , 516-M are fixed. In another embodiment, each of equalizer circuits 516-1, . . . , 516-M is adaptive. Each of the adaptive equalizer circuits 516-1, . . . , 516-M are either linear or nonlinear. In one embodiment, some of the equalizer circuits 516-1, . . . , 516-M are linear and some of the equalizer circuits 516-1, . . . , 516-M are nonlinear. In another embodiment, each of equalizer circuits 516-1, . . . , 516-M is nonlinear. In one embodiment, the nonlinear equalizers use a decision-feedback topology. In one embodiment, each of the equalizer circuits has a different structure (e.g., transversal or lattice) and adaptation algorithm. In one embodiment, equalizer circuits 516-1, . . . , 516-M use one of a recursive least squares adaptation algorithm, a least mean-square adaptation algorithm, a zero forcing adaptation algorithm, a gradient recursive least squares adaptation algorithm, a fast recursive least squares adaptation algorithm and a square root recursive least squares adaptation algorithm. In some embodiments, the operation of the various equalizer circuits 516-1, . . . , 516-M is varied by loading appropriate coefficients into the equalizer circuits prior to processing a burst transmission from a particular remote user.

Decoders 518-1, . . . , 518-M receive signals from their respective equalizer circuits 516-1, . . . , 516-M. In one embodiment, decoders 510-1, . . . , 510-M provide forward error correction for the signals from equalizer circuits 516-1, . . . , 516-M.

Decoders 518-1, . . . , 518-M are coupled to processing circuits 511-1, . . . , 511-M of processing block 513. Processing circuits 511-1, . . . , 511-M perform additional processing, e.g., descrambling, on signals from decoder block 512.

Second decoder block 515 includes a plurality of decoders 520-1, . . . , 520-M that are each coupled to a respective one of processing circuits 511-1, . . . , 511-M. Decoders 520-1, . . . , 520-M process the signals from processing block 513 at the packet level. In many systems, the time slots of a communication channel carry one or more discrete packets of information. In some embodiments, these packets include cyclic redundancy check (CRC) values. Decoders 520-1, . . . , 520-M process the packets to detect errors based on the CRC values. The signals from decoder block 520-1, . . . , 520-M are provided to selector circuit 514.

Decoder block 515 provides a feedback signal to equalizer bank 510. The feedback signal is used, in some embodiments to adjust, as necessary, the coefficients of the equalizers of equalizer bank 510. Decoder block 515 also provides a signal to selector circuit 514. This signal provides a measure of the quality of the signals in each of the parallel paths through equalizer bank 510, first decoder bank 512, processing bank 513, and second decoder bank 515.

In one embodiment, an additional feedback signal is provided to equalization bank 510 from first decoder bank 512.

In operation, equalizer circuit 500 processes a signal from signal conditioning circuit 506 with a plurality of equalizers to compensate for the adverse effects of multipath fading in a communication channel. Equalization circuit 500 processes the signal from signal conditioning circuit 506 in parallel in equalizer bank 510. The parallel output of equalizer bank 510 is provided to decoders 518-1, . . . , 518-M. Decoders 518-1, . . . , 518-M provide forward error correction to the signals from their respective equalizer circuits. Processing bank 513 performs further processing on the signals in the parallel paths such as descrambling. Second decoder bank 515 further performs error checking at the packet level.

Second decoder bank 515 also provides a signal to selector circuit 514 to select one of the outputs from second decoder bank 515. Selector circuit 514 provides the selected output to output 504 of equalization circuit 500 for further processing by processing circuit 508. Second decoder bank 515 also provides a feedback signal to equalizer bank 510 to be used in a jesting the equalization of the parallel paths of equalizer bank 510 for future signals.

CONCLUSION

Embodiments of the present invention have been described. The embodiments provide parallel processing of signals from a time division multiple access system at a receiver. The receiver processes parallel receive paths, each consisting of equalization and other receive functions, and then selects a path that provides acceptable, e.g., least, system error. Thus, channels with time varying characteristics are adequately compensated for adverse affects of multipath fading and the like.

Advantageously, the embodiments described reduce the preamble necessary for burst-by-burst equalization. In this type of equalization, no historical information (previous burst's coefficients) is maintained. By using different equalizer types and adaptation algorithms, including time constants, acceptable results are obtained for a wide variety of channels.

Embodiments of the present invention also reduce the problem of equalizer mismatch in systems that load historical information prior to a burst from a particular subscriber; e.g. where the coefficients of an adaptive equalizer calculated during a previous burst do not adequately equalize the channel after a period of time has elapsed.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, the parallel equalization of signals is not limited to a fixed wireless system. Parallel equalization may be used in fixed wireless, non-fixed wireless, and wired communication systems. Further, with respect to wireless systems, parallel equalization is not limited to use with signals in the MMDS spectrum. Signals in other frequency spectrums can be used. Also, as the number of equalizers approaches a large number, the parallel equalizer bank of the various embodiments may be configured as identical topology equalizers, each with a different initial coefficient.

What is claimed is:

1. An equalization circuit, comprising:
   an input adapted to receive signals from a communication channel;
   an equalizer bank having at least two equalizers coupled in parallel and coupled to the input;
   a first decoder bank having at least two packet decoder circuits coupled in parallel, each packet decoder circuit responsive to a corresponding one of the at least two equalizers of the equalizer bank;
   a selector circuit coupled to the decoder bank that selects an output signal of one of the at least two equalizer circuits based on processing of the decoder bank;
   an output coupled to the selector circuit that receives the selected output signal; and
   a second decoder bank having at least two error correction decoder circuits coupled in parallel, each error correction decoder circuit coupled to a corresponding one of the at least two equalizers of the equalizer bank and coupled to a corresponding one of the at least two packet decoder circuits.

2. The equalization circuit of claim 1, wherein the second decoder bank includes at least two forward error correction decoder circuits.

3. The equalization circuit of claim 1, wherein each of the at least two equalizers comprises one of a fixed equalizer and an adaptive equalizer.

4. The equalization circuit of claim 3, wherein each of the adaptive equalizers comprises one of a linear equalizer and a nonlinear equalizer.

5. The equalization circuit of claim 3, wherein each of the adaptive equalizers comprises one of a traversal structure and a lattice structure.

6. The equalization circuit of claim 1, wherein the first decoder bank provides a feedback signal to the at least two equalizers of the equalizer bank.

7. The equalization circuit of claim 6, wherein the feedback signal is also provided to the selector circuit to be used in selecting the output of one of the at least two equalizer circuits.

8. An equalization circuit, comprising:
   an input adapted to receive signals from a communications channel;
   a plurality of equalizer circuits coupled to the input and operable to generate a plurality of intermediate signals;
   a selector circuit, responsive to the plurality of equalizer circuits, that selects one of the intermediate signals;
   an output coupled to the selector circuit that receives the selected intermediate signal;
   a plurality of buffer circuits, each buffer circuit coupled between one of the plurality of equalizer circuits and the selector circuit to buffer the intermediate signals for approximately the duration of a time slot of the communication channel; and
   a plurality of error correction decoder circuits coupled in parallel, each decoder circuit coupled to a corresponding one of the plurality of equalizer circuits, wherein each of the plurality of buffer circuits is included in a corresponding one of the plurality of decoders.

9. The equalization circuit of claim 8, wherein each of the plurality of error correction decoder circuits is a forward error correction decoder circuit.

10. The equalization circuit of claim 8, wherein at least one of the plurality of error correction decoder circuits provides a feedback signal to at least one of the plurality of equalizer circuits.

* * * * *